J. F. O'CONNOR.
ROLLER SIDE BEARING.
APPLICATION FILED MAY 8, 1908.
940,353. Patented Nov. 16, 1909.
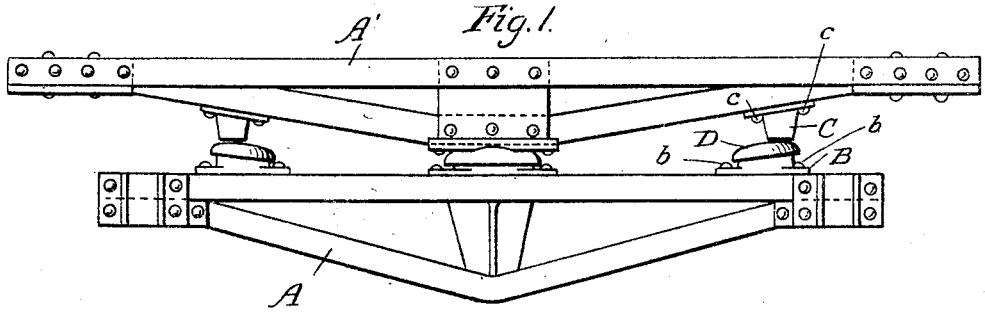
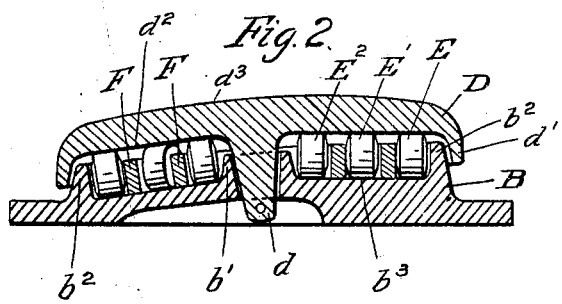
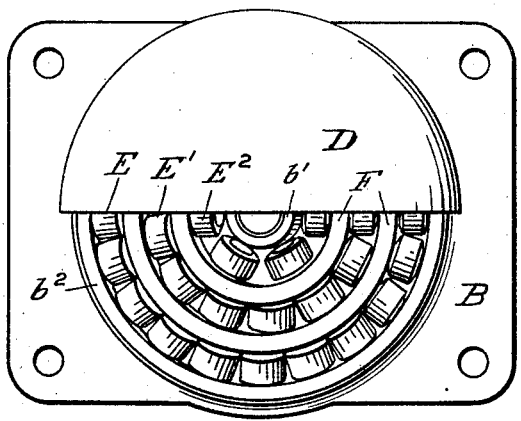
WITNESSES:
F. B. Townsend
N. W. Munday
INVENTOR
John F. O'Connor
BY
Munday, Evarts, Adcock & Clarke,
his ATTORNEYS

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

ROLLER SIDE BEARING.

940,353.  Specification of Letters Patent.  Patented Nov. 16, 1909.

Application filed May 8, 1908. Serial No. 431,661.

*To all whom it may concern:*

Be it known that I, JOHN F. O'CONNOR, a citizen of the United States, residing in Chicago, in the county of Cook and State of Illinois, have invented a new and useful Improvement in Roller Side Bearings, of which the following is a specification.

My invention relates to roller side bearings for railway cars.

My invention consists in the novel construction of parts and devices and in the novel combinations of parts and devices herein shown and described.

In the accompanying drawing forming a part of this specification, Figure 1 is a front elevation of a truck bolster and body bolster of a car provided with my invention. Fig. 2 is a central vertical section through one of the side bearings and Fig. 3 is a plan view partly broken away.

In the drawing, A represents the truck bolster, $A^1$ the body bolster, B the lower side bearing plate, C the upper side bearing or plate, D an interposed rotatable disk between the upper and lower side bearing plates, $E$ $E^1$ $E^2$ a plurality of sets or trains of anti-friction rollers interposed between the lower side bearing plate B and the rotatable disk D and F separating rings between the different sets of rollers $E$ $E^1$ $E^2$. The lower side bearing plate B is secured by bolts or rivets $b$ to the truck bolster and it is provided with an inner annular hub or rim $b^1$, an outer annular rim $b^2$ and with an inclined conical annular tread $b^3$ upon which the several sets of rollers $E$ $E^1$ $E^2$ travel. The upper side bearing or plate C is secured to the body bolster by bolts or rivets $c$.

The interposed rotatable disk D has a central conical stud or pivot $d$ which fits within the annular hub $b^1$ of the lower side bearing plate B. The axis of the hub $b^1$ and of the central stud or pivot $d$ is inclined somewhat to the vertical and toward the center of the car, so that the rotatable disk D occupies an inclined position. The rotatable disk D is further provided with an annular rim $d^1$ which telescopes over the annular rim $b^2$ of the lower side bearing plate B. The rotatable disk D is further provided with an annular conical tread $d^2$ parallel to the annular conical tread $b^3$ of the lower side bearing plate B.

The several sets of anti-friction rollers $E$ $E^1$ $E^2$ are arranged concentric with each other and separated from each other by separating rings F which fit loosely between the several sets of rollers and between the lower side bearing plate B and the rotatable disk D. These separating rings F by engagement with the end faces of the short rollers $E$ $E^1$ $E^2$ serve to keep each of the rollers in proper radial arrangement in respect to the lower side bearing plate B and rotatable disk D.

The lower side bearing plate B and rotatable disk D are so combined with the upper side bearing plate C that said upper side bearing plate contacts with the rotatable disk D outside of its axis or pivot stud $d$, as will be readily understood from Fig. 1 of the drawing. The rotatable disk D is provided with an upper rounded or curved bearing face $d^3$ for contacting with the upper side bearing plate C. The inclination of the rotatable disk D to the lower side bearing plate B is preferably such that the annular conical treads $b^3$ $d^2$ of said plate B and disk D under the upper side bearing C, will be substantially horizontal, as will be readily understood from Fig. 2 of the drawing.

I claim:—

1. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally-contacting rollers interposed between the lower side bearing plate and said rotatable disk, said lower bearing plate and said rotatable disk having annular conical treads parallel to each other the outer set being composed of a greater number of rollers than the inner set substantially as specified.

2. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally-contacting rollers interposed between the lower side bearing plate and said rotatable disk, said lower bearing plate and said rotatable disk having annular conical treads parallel to each other, the outer set being composed of a greater number of rollers than the inner set substantially as specified.

3. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally-contacting rollers interposed between the lower side bearing plate and said rotatable disk, said lower bearing plate and said rotatable disk having annular conical treads parallel to each other, and a separating ring between adjacent sets of anti-friction rollers, the outer set being composed of a greater number of rollers than the inner set substantially as specified.

4. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally-contacting rollers interposed between the lower side bearing plate and said rotatable disk, said lower bearing plate and said rotatable disk having annular conical treads parallel to each other, and a plurality of separating rings interposed between adjacent sets of anti-friction rollers, the outer set being composed of a greater number of rollers than the inner set substantially as specified.

5. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally-contacting rollers interposed between the lower side bearing plate and said rotatable disk, said lower bearing plate and said rotatable disk having annular conical treads parallel to each other, said lower bearing plate having an annular inner rim or hub and an annular outer rim, the outer set being composed of a greater number of rollers than the inner set substantially as specified.

6. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally-contacting rollers interposed between the lower side bearing plate and said rotatable disk, said lower bearing plate and said rotatable disk having annular conical treads parallel to each other, and a plurality of separating rings interposed between adjacent sets of anti-friction rollers, said lower bearing plate having an annular inner rim or hub and an annular outer rim, and said rotatable disk having an annular rim, the outer set being composed of a greater number of rollers than the inner set substantially as specified.

7. In a roller side bearing, the combination with body and truck bolsters, of an upper side bearing plate secured to the body bolster, and a lower side bearing plate secured to the truck bolster, an interposed inclined rotatable disk and a plurality of sets of radially arranged anti-friction short cylindrical peripherally contacting rollers interposed between the lower side bearing plate and said rotatable disk, said lower bearing plate and said rotatable disk having annular conical treads parallel to each other, and a plurality of separating rings interposed between adjacent sets of anti-friction rollers, said lower bearing plate having an annular rim or hub and an annular outer rim, and said rotatable disk having an annular rim and a central pivot stud journaled upon said lower side bearing plate, the outer set being composed of a greater number of rollers than the inner set, substantially as specified.

8. In a side bearing, the combination with body and truck bolsters and an upper bearing member secured to the body bolster, of a lower bearing plate secured to the truck bolster, an interposed rotatable inclined disk, anti-friction rollers between said lower bearing plate and said rotatable disk, said lower bearing member having an annular conical tread horizontally disposed at the portion thereof where the load is applied thereto by the upper bearing member, said annular conical treads of said lower bearing member and of said rotatable disk being parallel to each other, the outer set being composed of a greater number of rollers than the inner set substantially as specified.

9. In a side bearing, the combination with a lower bearing member having an annular conical tread horizontally disposed at the outer side or segment thereof, a rotatable inclined disk having an annular conical tread journaled on said lower bearing member and adapted to receive the load at its outer portion or segment only and anti-friction cylindrical rollers interposed between said lower bearing plate and said rotatable disk, said annular conical treads of said lower bearing member and of said rotatable disk being parallel to each other the outer set being composed of a greater number of rollers than the inner set substantially as specified.

10. In a side bearing, the combination with a lower bearing member having an annular conical tread horizontally disposed at the outer side or segment thereof, a rotatable inclined disk having an annular conical tread journaled on said lower bearing member and adapted to receive the load at its outer portion or segment only, and antifriction cylindrical rollers interposed between said lower bearing plate and said rotatable disk, said rotatable disk having an upper rounded or curved bearing contact face, said annular conical treads of said lower bearing member and of said rotatable disk being parallel to each other the outer set being composed of a greater number of rollers than the inner set substantially as specified.

JOHN F. O'CONNOR.

Witnesses:
H. M. MUNDAY,
EDMUND ADCOCK.